May 8, 1962 V. W. BALZER 3,033,620
THRUST BEARING
Filed March 14, 1960 2 Sheets-Sheet 1

VERNON W. BALZER,
INVENTOR.

BY Warren T. Jessup
Attorney

VERNON W. BALZER,
INVENTOR.

BY Warren T. Jessup
Attorney

United States Patent Office 3,033,620
Patented May 8, 1962

3,033,620
THRUST BEARING
Vernon W. Balzer, 2921 Via La Selva,
Palos Verdes Estates, Calif.
Filed Mar. 14, 1960, Ser. No. 14,741
12 Claims. (Cl. 308—162)

This invention relates to a thrust bearing, and more particularly to a bearing for a shaft having radial loads and angular thrust loads.

It has, in the past, been common to use labyrinth thrust bearings having the shoulders of the thrust faces at 90 degrees to the axis of shaft rotation. These thrust bearings, however, whether of the older type or the more modern type of horseshoe or segmental design, require standard sleeve-type bearings to maintain alignment of the thrust positions and shaft.

Additionally, in applications where thrust loads are variable and high, a ball type bearing capable of bearing the loads is often prohibitive in size and is excessively expensive to replace.

It is among the objects of this invention to provide a new and improved thrust bearing which, in combination, is capable of bearing both radial loads and angular thrust loads transmitted between a shaft and its bearing-casing.

It is a further object of this invention to provide a new and improved thrust bearing in which discrete annular bearing faces are capable of bearing one of the radial and angular thrust forces.

A further object of this invention is to provide a new and improved thrust bearing which is relatively economical to manufacture and which is more readily installed and removed for replacement thereof.

A general object of this invention is to provide a new and improved thrust bearing of the character described which overcomes disadvantages of prior thrust bearings heretofore intended to accomplish generally similar purposes.

These and other objects of this invention will be more apparent from the following detailed description, drawings and appended claims.

This invention provides a new and improved thrust bearing in which the radial bearing and the angular thrust bearing are combined into one bearing member to handle constant or variable loads imparted by the bearing casing to the shaft or by the shaft to the bearing casing. The instant thrust bearing provides a plurality of first annular faces of the shaft and the bearing-casing which are substantially perpendicular to the direction of the angular thrust load and a plurality of second annular bearing faces which are substantially perpendicular to the radial load being imposed on the bearing, thereby providing a composite angular thrust bearing formed to provide minimum thrust loads on the faces of lands of the bearing.

This invention further provides improved means for lubricating the thrust bearing whereby the lubricant is communicated between one end of the bearing and both sets of annular bearing faces to minimize wear from frictional engagement at the faces.

The thrust bearing of this invention is particularly useful in application to a shaft having oblique crank ends which are subjected to both radial and angular thrust loads, such as the shaft illustrated in my co-pending application entitled, "Reciprocating Machines," Serial No. 680,117, filed August 26, 1957. It is to be understood, however, that use thereof is not limited to such an application as many other uses will be apparent.

Figure 1:
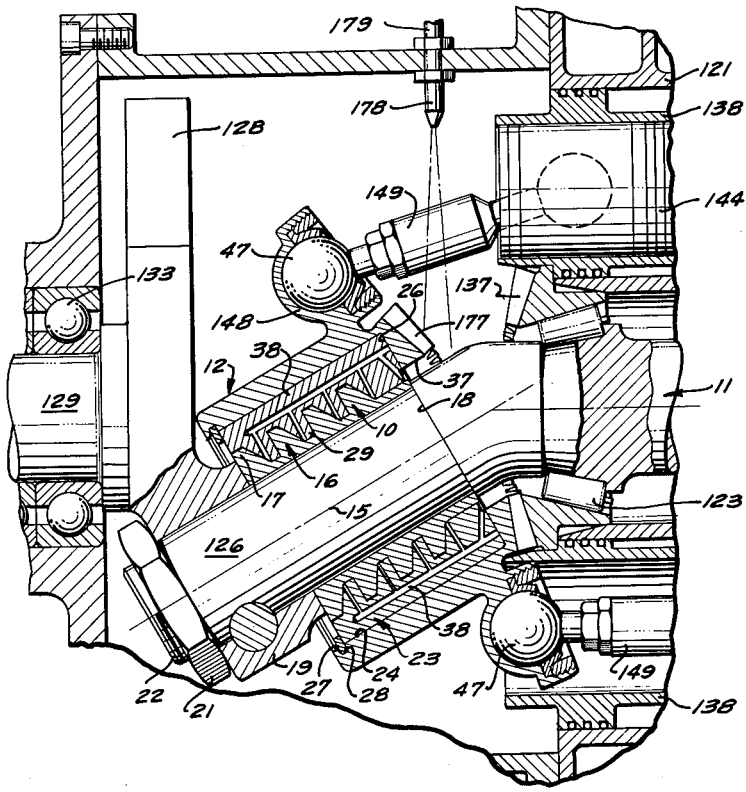
FIG. 1 is a fragmentary, vertical cross-sectional view, as taken substantially through the center line of a thrust bearing of this invention and illustrating an application thereof.
Figure 2:
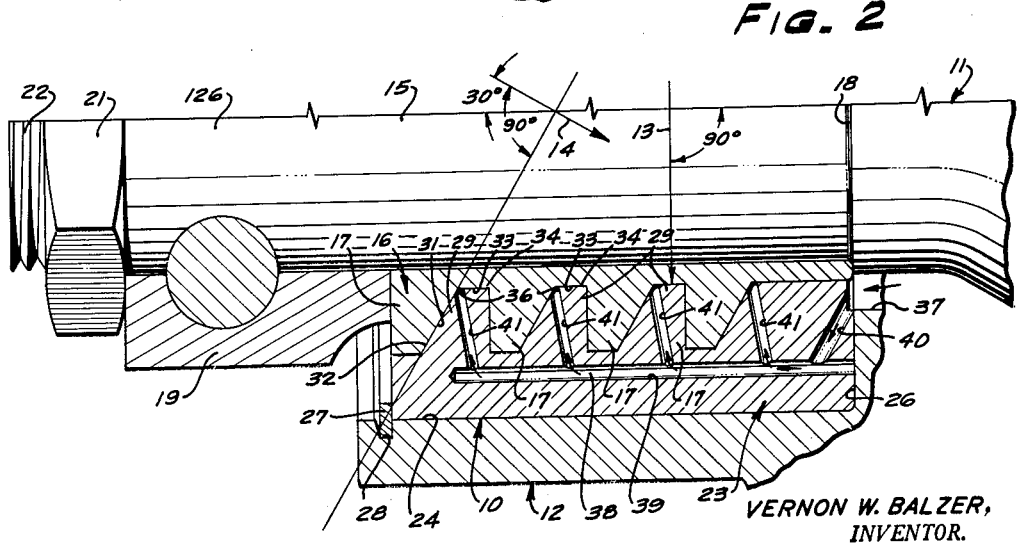
FIG. 2 is an enlarged fragmentary, cross-sectional view, illustrating the thrust bearing in greater detail.
Figure 3:
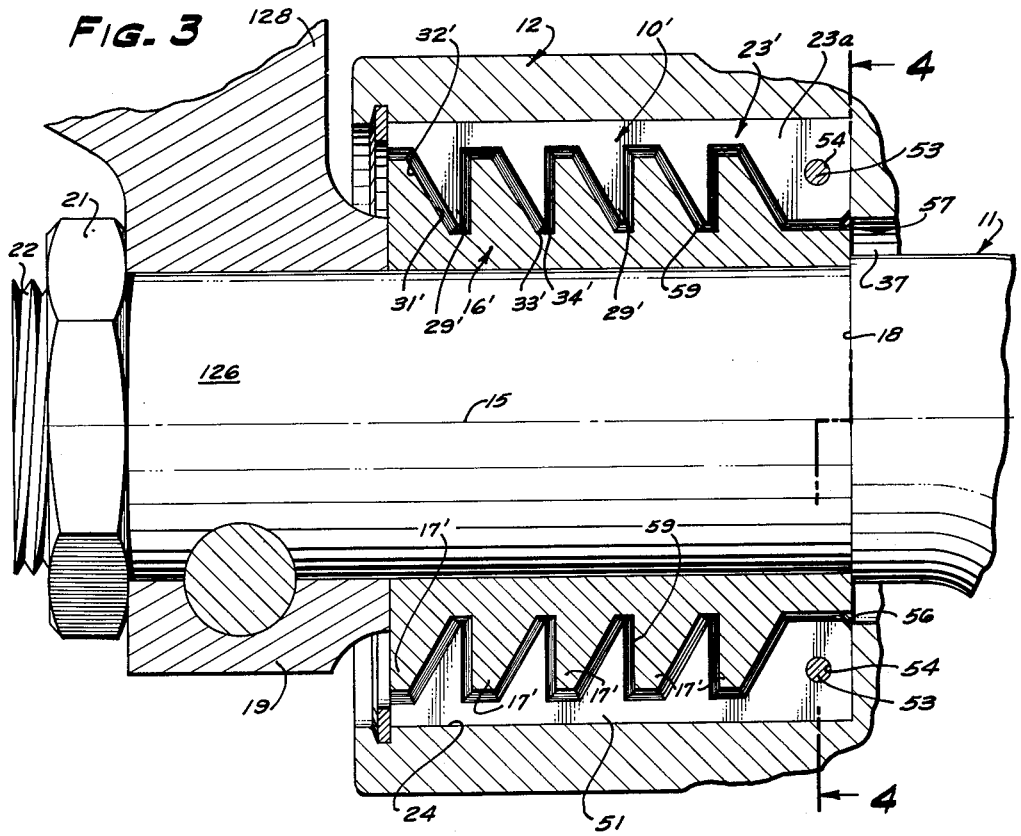
FIG. 3 is an enlarged fragmentary, cross-sectional view, illustrating another embodiment of my invention.
Figure 4:
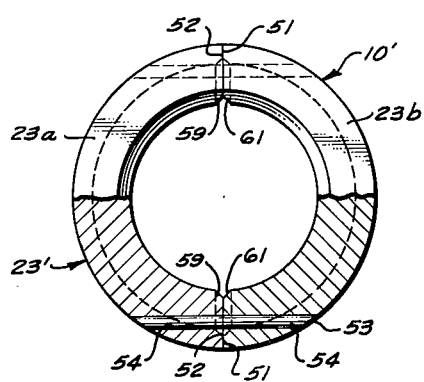
FIG. 4 is a cross-sectional view, taken substantially along the line 4—4 of FIG. 3, with parts thereof omitted for greater clarity.
Figure 5:
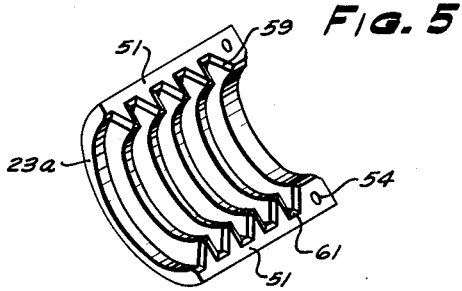
FIG. 5 is a perspective view, in elevation, illustrating a portion of FIG. 4 in greater detail.

Referring in detail to the drawings, there is shown, by way of illustration, but not of limitation, a thrust bearing designed and constructed in accordance with this invention and generally designated, in the first embodiment illustrated in FIGS. 1 and 2, by the numeral 10 and, in its second embodiment illustrated in FIGS. 3–5, inclusive, by the numeral 10′, like parts of the two embodiments being designated by like numbers.

As an example of an adaptation of the thrust bearing 10 and 10′ but not as a limitation thereof, the bearings are illustrated as surrounding an oblique crank portion of shafts 11 and 11′, respectively, of the "Reciprocating Machine" illustrated particularly in FIG. 20 of my co-pending application, Serial No. 680,117, filed August 26, 1957.

In reference to FIG. 20 of the above-identified application, a bearing casing 12, housing the bearings 10 and 10′ is the wabble spider 148 of the application which is connected at ball and socket joints 47, by a plurality of connecting rods 149, to a plurality of circumferentially and radially spaced pistons, the exhaust pistons 144 of the illustration being herein shown. The pistons 144 are slidingly disposed in cylinders 138 for reciprocation therein, the cylinders being supported in an engine block 121. Shaft 11, referred to by the number 122 in the above-mentioned application, is supported in bearings 123 for rotation relative to the engine block and includes a counterweight 128, secured to the oblique crank portions 126 of the shaft 11, and a shaft extension 129 rotatably supported in bearings 133 of an end wall, of the engine block 121.

As the pistons 144 reciprocate within their respective cylinders 138, a force is applied to the wabble spider 148, which is transmitted through the bearing gear 10 to the shaft 11 to rotate the shaft 11 within its bearings 123 and 129, the power of the shaft being taken off at the shaft extension 129. To prevent the spider 148 from rotating while it wabbles, a bevelled gear 137 is secured to the engine block 121 and is meshed with a bevelled gear 177 formed on the bearing casing 12.

As the wabble spider 148 (bearing casing 12) is wabbled, a radial load is applied to the crank portion 126 in a direction indicated by the arrowed line 13, substantially perpendicular to the axis of the shaft portion 126 and an angular thrust load is imparted thereto in the direction of the arrowed line 14 of FIG. 2.

Referring in greater detail to the first embodiment of the invention, the thrust bearing 10 of this invention comprises an inner sleeve 16 surrounding a portion of the oblique shaft portion 126 and having a plurality of axially-spaced, external, annular ribs 17. The inner sleeve 16 is secured to the shaft 11 rotation therewith by the clamping of the sleeve 16 between an annular shoulder 18 of the shaft and a collar portion 19 of the counterweight 128 surrounding the shaft portion 126, by a nut 21 having threaded engagement with a reduced, externally threaded end 22 of the shaft. The nut 21 abuts the section 19 to cause the section 19 to about the sleeve 16 and clamp the sleeve between the section and shoulder 18.

The bearing 10 further includes an outer race or sleeve 23 which has a press fit in an axial bore 24 of the bearing casing 12, the sleeve 23 being held between an annular shoulder 26 and a removable, split, retaining ring 27 seated in an annular groove 28. The outer sleeve 23 includes a plurality of axially-spaced, internal, annular ribs 29 interfitting the ribs 17 of the inner sleeve 16.

The interfitting ribs 17, 29 are complementary and include first annular bearing faces 31 and 32 of the sleeves 16, 23 respectively, which are substantially perpendicular to the direction of the angular thrust load indicated by the arrowed line 14. The lands between the ribs 17 and the outer cylindrical lands of the ribs 29 provide second annular bearing faces 33 and 34, respectively, substantially perpendicular to the direction of the radial load indicated by the arrowed line 13. The faces 31 and 32 are angular and oblique, relative to the axis 15 of the oblique crank 126, whereas the annular faces 33 and 34 are cylindrical and concentric to the axis 15, the oblique and cylindrical faces intersecting at points indicated at 36.

In this manner, the faces 31, 32 receive the angular thrust load while the faces 33 and 34 receive the radial loads.

The thrust bearing 10 is effectively and practically lubricated by a lubricant squirted or sprayed against the shaft 11 as through the lubricating nozzle 178 secured to the housing and supplied by a lubricant as through the conduit 179. The lubricant, as it is sprayed, enters through an opening 37 of the bearing casing 12, adjacent to one end of the bearing 10, the lubricant being communicated to the intersections 36 of the bearing faces, 31, 32, 33 and 34, through lubricant passages 38 provided in the outer sleeve 23 of the bearing. Each lubricating passage 38 includes a one or more longitudinal bores 39 communicating with the opening 37 and acting as manifolds to a plurality of substantially radial bores 41, each of which communicates with an intersection 36 for lubricating the annular faces 31–34, inclusive. As the inner sleeve 16 is rotated with the shaft 11, relative to the outer sleeve 23, the lubricant is drawn through the oil passages 38 to draw the lubricant to the intersection of the faces 31–34, whereat the rotation causes the lubricant to disperse to the annular bearing faces.

It is to be understood that although reference herein is being made to the co-pending application referred to above, it is to be understood that usage thereof is not to be limited to such application but that the thrust bearing of this invention may be used wherever both radial and/or angular thrust loads are placed against a shaft from its bearing-casing, or against a bearing-casing from its shaft, as the case may be. It is to be further understood that although it is preferable to have inner and outer sleeves 16 and 23 replaceable in order that the bearing may be more easily installed and more readily removed for replacement thereof, the ribs 17 may be formed integrally with the shaft 11 and the ribs 29 may be formed integrally with the bearing casing 12.

The inner sleeve 16 is preferably formed of a relatively hard material such as Nitroloy, or optionally externally coated therewith, whereas the outer sleeve 23 is preferably of a good bearing material such as bronze or aluminum bronze for increased wearing ability between the bearing faces. For practicability of installation, the sleeve 23 is preferably split so that it may be installed over the inner sleeve 16 before being inserted into the bore 24.

Referring more particularly to the FIGURES 3–5, inclusive, the second embodiment of this invention, wherein the thrust bearing is referred to by the numeral 10′, the thrust bearing is substantially similar in construction to the thrust bearing 10 for bearing radial and angular thrust loads between the bearing-casing 12 and the shaft 11 with the exception of the modified lubricating means therefor.

In the instant embodiment, the thrust bearing 10′ comprises an inner sleeve 16′ secured to the shaft 11 on the circumferentially relieved, oblique portion 126 by clamping thereof between the section 19 of the counterweight 128 and the shoulder 18, similarly to the mounting of the sleeve 16 in the first embodiment, and an outer sleeve 23′ having a press-fit in the bore 24 of the bearing-casing 12. The outer sleeve 23′ is split, as is the outer sleeve 23, into half-sections 23a and 23b, when in abutment after being installed over the inner sleeve 16′, and preferably are secured together as by a plurality of transverse pins 53 extending through aligned bores 54 of the half-sections.

The inner sleeve 16′ is provided with a plurality of axially spaced, external, annular ribs 17, each having first annular face 31′ perpendicular to the direction of the angular thrust load and cylindrical portions 33′ between the ribs forming second annular bearing faces substantially perpendicular to the direction of the radial load.

The outer sleeve 23′ of the bearing 10′ includes a plurality of axially-spaced external annular ribs 29′, each similar to the ribs 29 and including oblique annular bearing faces 32′ complementary to the bearing faces 31′ and cylindrical bearing faces 34′ complementary to the annular bearing faces 33′ for radial loads.

The lubricating means for the thrust bearng 10′ comprises a pair of diametrically opposite oil passages 56 and 57 communicating between the enlarged opening 37 adjacent to one end of the bearing through which the lubricant sprays as previously described in the first embodiment.

Each passage 56, 57 comprises mating, bevelled edges of each section 23a, 23b formed at the mating edges 51—52 thereof. As best seen in FIG. 5, each section is continuously bevelled at the inner edge 59 of the mating edge 51 whereas the inner edge of the mating face 52 is similarly bevelled as at 61 so that when the sections 23a and 23b are assembled in abutting, contiguous relationship, a V-shaped notch is formed. The notches, together with the outer surface of the sleeve 16′ defines the oil passage 56 and 57.

In this manner, the lubricant is communicated to the annular bearing surfaces 31′–34′ when the sleeve 16′ is rotated relative to the sleeve 23′ to prevent excessive friction and wear at the faces.

While the instant invention has been shown and described herein in what is conceived to be the most practical and preferred embodiments, it is recognized that departures may be made therefrom within the scope of the invention which is therefore not to be limited to the details disclosed herein but is to be accorded the full scope of the claims.

I claim:

1. In combination with a rotatable shaft having an angularly offset end and a wabble plate rotatably mounted on said offset end, a thrust bearing for radial and angular loads comprising a bearing casing surrounding said end of said shaft and fixed to said wabble plate, an inner sleeve fixed on said shaft end for rotation therewith, an outer sleeve fixed on said bearing casing and circumjacent said first sleeve, each sleeve being complementary to the other and having complementary, substantially conical bearing faces substantially perpendicular to the direction of the angular thrust loads, and complementary substantially cylindrical bearing faces substantially perpendicular to the direction of the radial loads.

2. In combination with a rotatable shaft having an angularly offset end and a wabble plate rotatably mounted on said end, a thrust bearing for radial and angular loads comprising a bearing casing surrounding a portion of said shaft end and fixed to said wabble plate, an inner sleeve fixed on said shaft end and having a plurality of axially spaced external annular ribs, an outer sleeve fixed in said bearing casing circumjacent said inner sleeve and having a plurality of spaced internal annular ribs interfitting with said ribs of said inner sleeve, said interfitting ribs being complementary and having substantially conical bearing faces thereon substantially perpendicular to the direction of the angular thrust load, and substantially cylindrical bearing faces substantially concentric to the axis of said shaft end and perpendicular to the direction of the radial load.

3. The combination defined in claim 2 wherein said bearing faces intersect each other.

4. The combination defined in claim 3 including means defining lubricant passages in said outer sleeve and communicating between said intersection of said bearing faces and exterior of one end of said second sleeve and means supplying a lubricant to said one end, said lubricant being moved by centrifugal force through said passages to said intersection of said bearing faces in response to relative rotation between said sleeves, for lubricating said faces.

5. The combination defined in claim 4 wherein said lubricant passages include at least one longitudinal passageway communicating with said sleeve end and a transverse capillary passageway communicating between said longitudinal passageway and each of said intersections of said bearing faces.

6. The combination defined in claim 4 wherein said outer sleeve is longitudinally split into half sections, each half section being internally ribbed so as to form contiguous annular ribs when assembled together, the inner peripheral edge of mating edges of said half sections being relieved so as to define, with the outer surfaces of said inner sleeve, a continuous lubricant passageway at the mating edges communicating with said end when said half sections are assembled.

7. The combination defined in claim 6 including aligned transverse apertures in each said half section, and pin means extending through said aligned apertures of each of said sections for securing said sections together.

8. In combination with a rotatable shaft having an angularly offset end and a wabble plate rotatably mounted on said end, said shaft end tracing a conical path during rotation of said shaft, a thrust bearing for radial and angular loads comprising a plurality of axially spaced external annular ribs affixed to said shaft end, a bearing casing surrounding said shaft end and having affixed thereto a plurality of axially spaced internal annular ribs interfitting said ribs of said shaft end, said interfitting ribs being complementary and each having a substantially conical bearing surface thereon substantially perpendicular to the direction of the angular thrust load and a substantially cylindrical bearing surface substantially perpendicular to the direction of the radial load.

9. The combination defined in claim 8 wherein said conical and cylindrical bearing faces intersect each other.

10. The combination defined in claim 9 including means defining lubricant passages in said bearing casing and communicating between said annular bearing faces and the exterior of one end of said bearing casing, and means for supplying a lubricant to said one end of said bearing casing, said lubricant being moved by centrifugal force through said passage and by capillary action to said intersection of said bearing faces in response to relative rotation between said bearing casing and said shaft end, for lubricating said faces.

11. The combination defined in claim 10 wherein said lubricant passages include at least one longitudinal passage communicating with said end of said bearing casing, and a transverse capillary passage communicating with said longitudinal passage and each of said intersections of said bearing faces.

12. The combination defined in claim 10 wherein said bearing casing is longitudinally split into half sections, each half section being internally ribbed so as to form contiguous annular ribs when assembled together, the inner peripheral mating edges of said half sections being relieved so as to define, with the outer surfaces of said shaft end, a continuous lubricant passage at the mating edges communicating with said end of said bearing casing when said half sections are assembled.

References Cited in the file of this patent

UNITED STATES PATENTS

| 602,589 | Sellers | Apr. 19, 1898 |
| 1,110,030 | Alexanderson | Sept. 8, 1914 |
| 2,386,491 | Brown | Aug. 2, 1921 |

FOREIGN PATENTS

| 117,229 | Great Britain | July 11, 1918 |